3,674,620
REINFORCED PLASTIC PANEL AND METHOD
OF MAKING THE SAME
Robert P. McCarthy, Overland Park, Kans., and Charles W. Matlock, Grandview, Mo., assignors to Butler Manufacturing Company, Kansas City, Mo.
Continuation of application Ser. No. 22,153, Mar. 24, 1970. This application May 25, 1970, Ser. No. 40,332
Int. Cl. B32b 3/28; B32h 17/28
U.S. Cl. 161—133
14 Claims

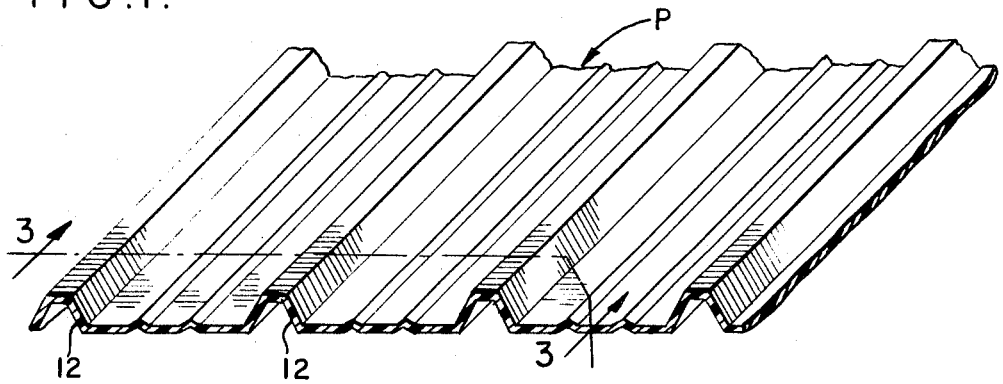
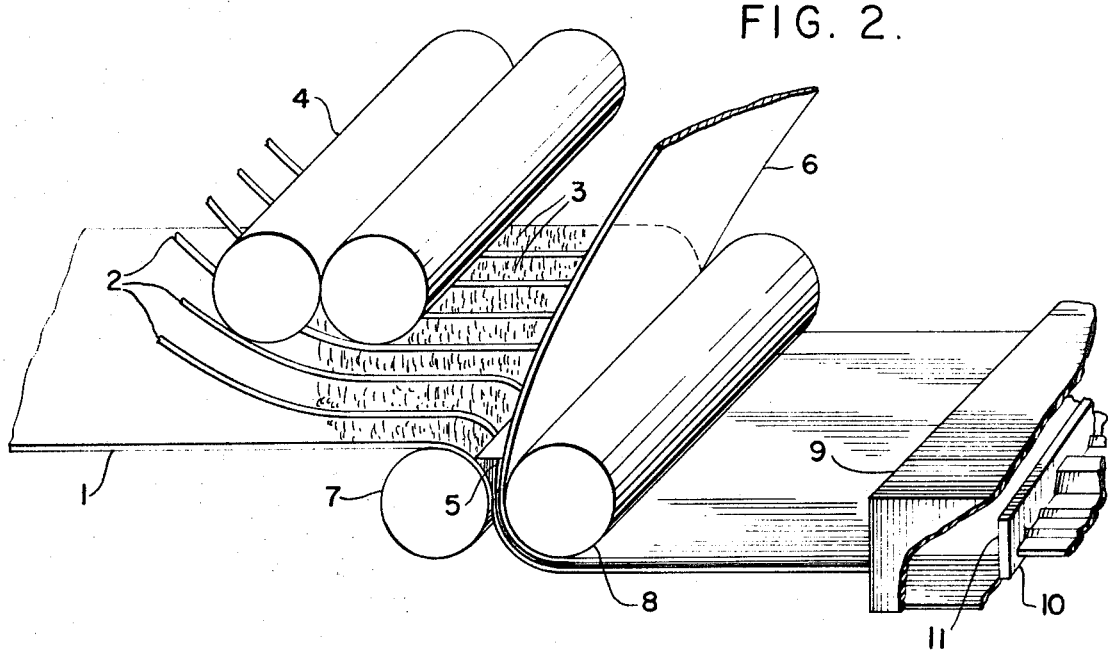
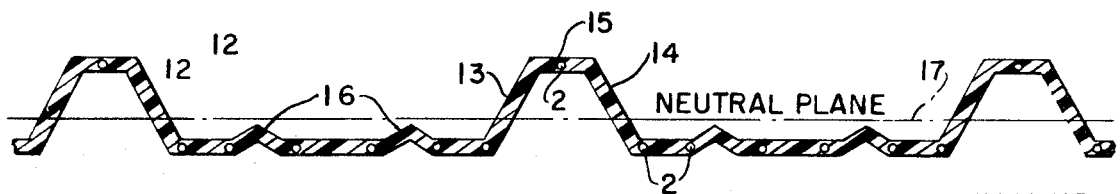

ABSTRACT OF THE DISCLOSURE

A corrugated panel having a neutral plane, continuous elongated longitudinally disposed spaced apart reinforcing means positioned at least at the apices of the corrugations in said panel and spaced from the neutral plane of the panel to impart maximum strength thereto, and the method of making such panel.

BACKGROUND OF THE INVENTION

This application is a continuation of application Ser. No. 22,153, filed Mar. 24, 1970, now abandoned.

This invention relates to a polyester plastic panel reinforced with continuous glass fiber rovings or metal wires and to the method of making the same.

In the past, composite sheets or panels have been made from various resinous materials having reinforcing means therein but such panels generally incorporate sheet-type reinforcing material, such as a woven fabric or a resin bonded mat of stranded material, or of randomly oriented chopped glass strands or fibers embedded in the resin. These panels are sometimes manufactured with a substantial thickness and incorporate a substantial quantity of resin and glass therein in order to achieve a desired strength. The result is an expensive and unwieldy panel exhibiting only slightly improved strength characteristics since the reinforcing means is not disposed at a maximum distance from the neutral plane of the panel.

The plastic panel reinforced with continuous glass rovings or metal wires according to the present invention has substantially improved physical characteristics over such prior art panels and can be manufactured considerably more economically by the use of continuous glass rovings or metal wires embedded in the composite sheet at the apices of corrugations therein and thus disposed at a maximum distance from the neutral plane of the panel. The disposition of the continuous glass fiber rovings or metal wires at a maximum distance from the neutral plane of the panel results in a panel which has superior strength and which at the same time requires much less material therein than do prior art panels of comparable strength.

OBJECTS OF THE INVENTION

It is an object of this invention to provide a corrugated panel having continuous reinforcing means embedded therein and disposed in the apices of the corrugations to space the reinforcing means a maximum distance from the neutral plane of the panel to thus impart maximum strength to the panel.

It is another object of this invention to provide a corrugated polyester plastic paned reinforced with continuous glass fiber rovings or metal wires and which exhibits superior strength, more resistance to creep under load, and higher bearing strength while at the same time being more economical because of the fact that less total glass and less resin are required for a panel having a given strength than prior art plastic panels comparable in size and shape.

It is another object of this invention to provide a chopped glass or wire strand reinforced polyester plastic panel having continuous glass fiber rovings or metal wires embedded therein on one-half to two inch centers with said rovings or wires spaced a maximum distance from the neutral plane of said panel.

It is a specific object of this invention to provide a chopped glass or wire strand reinforced polyester plastic panel having continuous glass fiber rovings or metal wires embedded therein at the apices of corrugations in said panel and spaced from the neutral plane of the panel to impart maximum strength thereto.

It is a still further object of this invention to provide a method of making a continuous glass fiber or metal wire reinforced plastic panel as above.

SUMMARY OF THE INVENTION

In general, the foregoing objects are obtained by providing a polyester plastic panel formed by feeding a carrier sheet of cellophane material or the like through a fabricating machine wherein a plurality of continuous glass fiber rovings or metal wires are deposited on said carrier sheet in longitudinal relationship thereto and spaced apart in parallel relationship within the range of approximately one-half to two inch centers, depositing a layer of chopped glass fibers or short metal wire strands over said rovings, depositing a measured quantity of resin over said chopped fibers, and depositing a cover sheet of cellophane or the like over said layer or resin. Alternatively, some of the chopped glass fibers or wire strands may be deposited on the carrier sheet after which the rovings or wires are placed and then more chopped glass fibers or wire strands put on top of the rovings. The wire strands and continuous reinforcing wires may comprise steel or the like and preferably are coated with a silyl peroxide adhesion promoter such as Y–5620, from Union Carbide. The composite sheet thus formed is then passed through rolls to squeeze out the air and establish the thickness of the sheet and the sheet thus pressed is then passed through an oven to expedite setting of the resin and during which operation the composite sheet is given a predetermined corrugated shape. By this method, the rovings or reinforcing wires can be precisely positioned on the lower carrier film so that they are fixed in the cured panel along lines at a maximum distance from the center of moment for the panel cross section. The resulting corrugated panel thus exhibits superior strength to prior art panels because of the provision of the continuous longitudinally disposed reinforcing rovings or wires at the apices of the corrugations, since the reinforcing effect increases with the square of its distance from the neutral plane of the panel in accordance with the concept of the effect on the material in a beam when it is bent under load.

The particular neutral axis of a corrugated panel which is of importance in this invention is actually an imaginary plane which is parallel to the flat part of the panel and lies between it and the plane of the apices of the corrugations. Roughly speaking, the neutral plane is located such that the product of the weight of material (reinforced plastic) above the plane times its distance from the plane is equal to the product of the weight of material below the plane times its distance from the plane. The neutral plane lies slightly above the flat part of the panel and intersects the corrugations part way up their sides to form imaginary lines. Reinforcing fibers at or near those lines of intersection contribute almost nothing to the resistance of the panel to deflection under load as it is normally encountered. Fibers in the flat portions of the panel are somewhat removed from the neutral plane and help resist deflection to a corresponding extent. The contribution of the reinforcement increases with the square of its distance from the neutral plane. Reinforcing means (the longitudinal rovings or wires) in the apices of the corrugations are well removed from the neutral plane and thus contribute significantly to resistance to deflection.

BRIEF DESCRIPTION OF THE DRAWINGS

FIG. 1 is a top perspective view of the reinforced panel according to the present invention showing the manner in which the panel may be corrugated with the rovings or wires disposed at the apices of the corrugations;

FIG. 2 is a top perspective view illustrating diagrammatically the disposition of the carrier sheet, rovings or wires, chopped glass fibers or wire strands, resin, and cover sheet and showing diagrammatically some of the apparatus for making the panel;

FIG. 3 is a cross-sectional end view taken along line 3—3 in FIG. 1 showing the position of the neutral plane with respect to the panel.

DETAILED DESCRIPTION OF THE INVENTION

Referring now to the drawings wherein like reference numerals refer to like parts throughout the several views, and particularly FIGS. 2 and 3, the reinforced plastic panel P according to the present invention comprises a composite sheet having a bottom carrier sheet or film 1 made of paper or plastic or a cellulose film such as cellophane or the like immediately over which are disposed in spaced parallel longitudinal fashion a plurality of continuous glass fiber reinforcing rovings 2 spaced approximately on two inch centers in a preferred embodiment, although the rovings could be spaced apart within the range of from one-half to two inches. Alternatively, and of economic interest, the reinforcing means 2 could comprise continuous metal wires of small diameter, particularly steel, and preferably coated with a silyl peroxide adhesion promotor such as Y-5620, from Union Carbide. Immediately over the rovings or wires is a layer of chopped glass fibers 3 fed from a trough or other apparatus such as glass fiber chopping and feeding apparatus 4 or the like and bonded with a thermo-setting resin 5, such as epoxy or polyester, fed from a suitable source. A top or cover sheet or film 6 made of cellophane or the like is disposed over the composite sheet thus far described and the sheet is then subjected to compression by suitable means such as between rollers 7 and 8 and then heated in an oven 9 to cause polymerization and setting of the resin. During the heating operation, the composite sheet is formed into any desired cross-sectional shape, such as, for example, that seen in FIGS. 1 and 3, by means of forming strips 10 and 11. Subsequent to the heating and forming operation, the panel is trimmed and cut to desired lengths. According to one modification of the invention, a layer of chopped glass fibers or strands may first be placed on the carrier sheet after which the longitudinal rovings or wires are positioned and then more chopped glass strands or fibers placed over the rovings or wires.

As an alternative to the chopped glass fibers, short metal wires, such as steel or the like and preferably coated with an adhesion promotor such as silyl peroxide as used on the continuous wire reinforcing means, could be used in this invention.

The glass fiber or metal wire reinforced plastic panel P has a first series of spaced parallel relatively large corrugations 12 substantially trapezoidal in cross-sectional outline extending upwardly from the plane of the panel and having a pair of oppositely inclined side walls 13 and 14 and a top wall 15. A pair of equally spaced upwardly formed relatively smaller corrugations or ribs 16 are formed in the panel intermediate the large corrugations and on the same side of the panel as the large corrugations and are generally triangular in cross-sectional outline.

As seen most clearly in FIG. 3, the plurality of equally spaced longitudinally disposed continuous glass fiber rovings or metal wires 2 are disposed closely adjacent the lower surface or carrier film 1 of the plastic panel on about two inch centers, although the spacing may be within the range of one-half to two inches, with a roving or wire 2 being positioned in the top wall 15 at the apex of each of the large corrugations 12 and a roving or wire 2 positioned on each side at the base of the large and the small corrugations or ribs, respectively. As seen in this figure, the neutral plane or center of moment 17 of the plastic panel is just above the plane of the flat part of the panel and is intermediate the ends of the inclined side 13 and 14 of the large trapezoidal shaped corrugations 12. Thus, substantially all of the mass of the plastic panel is spaced from the neutral plane and the longitudinal glass fiber or metal wire reinforcing means 2 are spaced a maximum distance from the neutral plane, the rovings or wires at the apices or crests of the large corrugations being located the greater distance from the neutral plane and thus imparting significantly greater strength to the plastic panel since the resistance to deflection or the contribution of the reinforcement to the strength of the panel increases with the square of its distance from the neutral plane.

Accordingly, not only is the panel reinforced simply because of the inclusion therein of continuous longitudinal glass fiber or metal wire reinforcing means, but the novel positioning of the rovings or wires at a maximum distance from the neutral plane of the plastic panel at the apices of the panel corrugations contributes significantly to the resistance of the panel to deflection.

The finished panel is hard and transparent or translucent and the glass fiber rovings or metal wires and chopped glass fibers or metal wire strands add strength and toughness to the panel. The rovings and reinforcing strands or wires need not be glass fiber or metal wire as specifically prescribed above, but can be any of various kinds of synthetic or inorganic fibers or vegetable fibers or animal fibers and any cross-sectional shape may be given to the panel so long as the panel is provided with corrugations or offset portions and continuous longitudinal rovings or the like are disposed at the apices of such corrugations or offset portions so as to be disposed a maximum distance from the neutral plane of the panel.

The panel according to the present invention has particular utility in skylights, wall panel patio roofs, rigid light transmitting awnings and the like.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. A corrugated synthetic resin panel having parallel ridges and furrows and a neutral plane, a plurality of spaced apart, parallel, continuous, elongate, longitudinally disposed reinforcing means with circular cross-sectional configuration in said panel, some of said reinforcing means in the crests of the ridges of the panel and some of said reinforcing means in the furrows of the panel and thus spaced from the neutral plane of the panel to impart maximum strength thereto.

2. A panel as in claim 1, wherein the reinforcing means comprise continuous glass fiber rovings.

3. A panel as in claim 2, wherein the centers of the rovings are spaced apart a distance within the range of approximately ½ to 2 inches.

4. A panel as in claim 1, wherein the reinforcing means comprise continuous metal wires.

5. A panel as in claim 4, wherein the metal wires are small diameter steel wires and are coated with adhesion promoter.

6. A panel as in claim 5, wherein the adhesion promoter comprises silyl peroxide.

7. A panel as in claim 1, wherein the panel comprises a polyester plastic material.

8. A panel as in claim 1, wherein the corrugations comprise a series of spaced parallel relatively large corrugations on one side of the panel, and pairs of spaced parallel relatively small corrugations or ribs between said large corrugations and on the same side of said panel as said large corrugations, at least some of said reinforcing means positioned at the crests of said large corrugations.

9. A panel as in claim 8, wherein said relatively large corrugations are generally trapezoidal in cross-sectional outline and said small corrugations or ribs are generally triangular in cross-sectional outline.

10. A panel as in claim 8, wherein the panel includes a flat part, the neutral plane of the panel spaced from the flat part of the panel on the same side of the panel as said corrugations and located near the base of said relatively large corrugations.

11. A corrugated panel as in claim 8, wherein the large corrugations are trapezoidal in cross-sectional outline and include oppositely inclined side walls and a top wall, the neutral plane of the panel spaced from the plane of the flat part of the panel on the same side of the panel as the corrugations and disposed intermediate the sides of the large corrugations, at least some of said reinforcing means positioned in the top wall of said large corrugations and thus disposed at a maximum distance from the neutral plane of the panel to impart maximum strength thereto.

12. A corrugated panel as in claim 1, wherein the panel is further reinforced with a plurality of randomly oriented chopped glass fibers embedded therein.

13. A corrugated panel as in claim 1, wherein the panel is further reinforced with a plurality of randomly oriented short metal wires having a small diameter and embedded in the panel.

14. A corrugated polyester plastic panel having parallel ridges and furrows and a neutral plane, a plurality of spaced apart parallel, continuous, elongate, longitudinally extending metallic reinforcing means with circular cross sectional configuration in said panel, some of said reinforcing means in the crest of the ridges of the panel and some of the reinforcing means in the furrows of the panel and thus spaced from the neutral plane of the panel to impart maximum strength thereto, and a plurality of randomly oriented short metal wires embedded in said panel.

References Cited
UNITED STATES PATENTS

| | | | |
|---|---|---|---|
| 1,931,494 | 10/1933 | Hurden et al. | 161—133 |
| 3,071,180 | 1/1963 | Finger et al. | 156—519 |
| 2,748,028 | 5/1956 | Richardson | 161—DIG 4 |
| 2,192,516 | 3/1940 | Cunnington | 161—151 |

DOUGLAS J. DRUMMOND, Primary Examiner

U.S. Cl. X.R.

161—143, 162; 156—179